US005279331A

United States Patent [19]

Fernandez

[11] Patent Number: 5,279,331

[45] Date of Patent: Jan. 18, 1994

[54] DISTRIBUTOR VALVE DEVICE FOR HYDRAULIC REMOTE CONTROL

[75] Inventor: Antonio Fernandez, Saint-Priest, France

[73] Assignee: Rexroth-Sigma, Venissieux Cedex, France

[21] Appl. No.: 15,585

[22] Filed: Feb. 10, 1993

[30] Foreign Application Priority Data

Feb. 10, 1992 [FR] France ................................ 92 01461

[51] Int. Cl.[5] ........................................ F16B 13/08

[52] U.S. Cl. ........................................ 137/884; 137/596

[58] Field of Search ................................ 137/596, 884

[56] References Cited

U.S. PATENT DOCUMENTS 2,935,090 5/1960 Arnot .

3,107,694 10/1963 Hastings et al. .

FOREIGN PATENT DOCUMENTS 3014927 10/1981 Fed. Rep. of Germany .

*Primary Examiner*—Gerald A. Michalsky

*Attorney, Agent, or Firm*—Larson and Taylor

[57] ABSTRACT

A hydraulic remote control distributor valve device comprises a flat body (1) having two main assembly faces (3) to enable a multiple hydraulic remote control block to be built up, and two side faces and a bottom face (5) that are narrow and on which orifices are located for receiving link couplings for hydraulic connection with a source of hydraulic fluid under pressure and with a component to be controlled. Two outlet orifices (A, B) are situated on the bottom face of the body (5) and the width e of the bottom face (5) is less than the diameter d of the link couplings suitable for fixing on the outlet orifices. The two outlet orifices (A, B) are disposed asymmetrically relative to the median plane (M) of the body (1) that extends perpendicularly to the main faces and to the bottom face (5), said orifices being offset relative to the plane (M) by an offset 1 that is equal to or greater than $\frac{1}{2}\sqrt{(d^2-e^2)}$. Assembly means situated on the main faces of the body (1) are disposed symmetrically relative to said median plane (M).

4 Claims, 2 Drawing Sheets

DISTRIBUTOR VALVE DEVICE FOR HYDRAULIC REMOTE CONTROL

Figure 1:
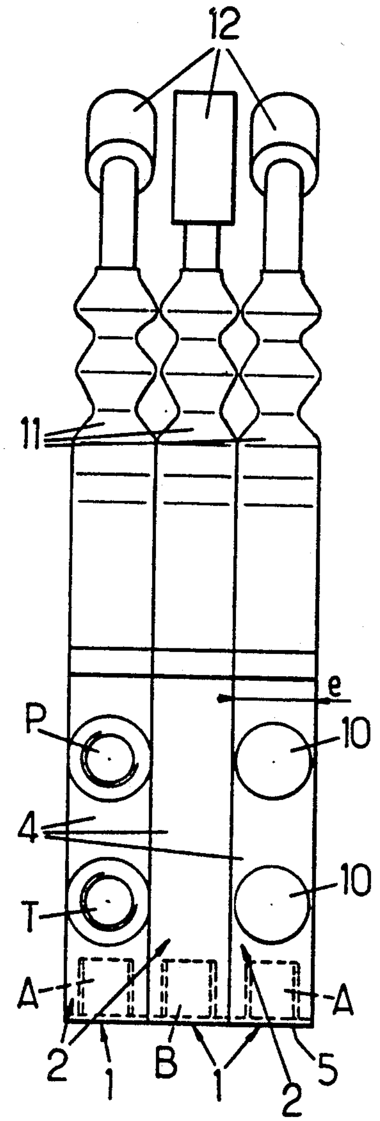

The present invention relates to improvements to distributor valve devices for hydraulic remote control, also referred to as hydraulic control switches, namely hydraulic apparatuses for placing between a source of hydraulic fluid under pressure and a controlled hydraulic member, and which include actuator means (generally associated with a lever or a pedal) suitable for enabling said hydraulic member to be controlled by varying the amount of hydraulic fluid under pressure it receives from the source.

The invention relates more particularly to such distributor valve devices for hydraulic remote control that include a body that is generally approximately in the form of a flat parallelepiped having:

two main faces provided with assembly means enabling at least two distributor valve devices for hydraulic remote control to be stacked together main face against main face, thereby forming a multiple hydraulic remote control block; and two side faces and a bottom face of small width for receiving hydraulic couplings for connecting the device respectively with the source of hydraulic fluid under pressure and with the component to be controlled.

In special applications, there presently exists a demand for distributor valve devices for hydraulic remote control that are very narrow and that can be installed in extremely small empty spaces. Unfortunately, this can give rise to technological conflict between reducing the thickness of the body of the device to as small a size as possible and the size of certain components; this applies in particular to hydraulic couplings that are mounted on the edges of the body (i.e. on one of the side faces or on the bottom face) for which it may be desirable to use components having an outside diameter that is greater than the small thickness that has been given to the body. This may arise, for example, for reasons of reliability and of sealing, or else in order to standardize couplings, or indeed for reasons of interchangeability. In general terms, the term "outside diameter" is used to designate, the maximum transverse dimension of a coupling, i.e. its diameter proper for a circular section coupling, or its diameter between vertices if the coupling is polygonal in section, e.g. hexagonal. By way of concrete example, it is presently possible to manufacture control switches having a thickness of 20 mm, thereby making it possible to build up blocks of three control switches that are only 60 mm across, whereas with conventional control switches that are 33 mm thick, a block having only two switches is already 66 mm across. However, standard ¼" G-type couplings as used on prior control switches have an outside diameter of about 22 mm, which is greater than the 20 mm thickness of the new control switches, and which prevents a plurality of such control switches being assembled together by stacking if they are conventional in design.

Furthermore, even if the diameter of the coupling is less than the thickness of the control switch, a coupling whose diameter is too close to that of the thickness makes it impossible to use a wrench for tightening the coupling to the body of the control switch.

An essential object of the invention is thus to provide a special organization of such hydraulic remote control distributor valve devices enabling a plurality of devices to be stacked together without difficulty even if they are fitted with couplings that are larger in diameter than the individual thicknesses of said devices, without any complications or drawbacks arising during manufacture or any restrictions arising in installing or using said remote control devices.

To these ends, a hydraulic remote control distributor valve device of the type to which the invention applies is essentially characterized:

in that two working fluid outlet orifices for connection to the hydraulic component to be controlled are situated on the bottom face;

in that the narrowness of the body is such that the width e of the bottom face is less than the diameter d of the link couplings that may be fitted to said outlet orifices;

in that the two outlet orifices are disposed asymmetrically relative to a median plane of the body perpendicular to the main faces and the bottom face, being offset relative to said median plane by an offset 1 equal to or greater than $\frac{1}{2}\sqrt{(d^2-e^2)}$; and in that the assembly means situated on the main faces of the body are disposed symmetrically about said median plane.

Because of this organization, it is possible to assemble two distributor valve devices together with the main face of one facing tee main face of the other, which is made possible by the symmetrical disposition about the median plane of the assembly means provided on the main faces; furthermore, because the two outlet orifices of each device are disposed asymmetrically about the median plane, the outlet orifices of a plurality of successive devices disposed in an alternating reversed, and non-reversed configuration are mutually offset. It is then possible to fit each of them with couplings that may be greater in diameter than the individual width of the bodies, with the couplings thus being free to overlap over the adjacent device(s).

An additional advantage is obtained which is related to the fact that in hydraulic remote control distributor valve devices of the kind in question, the manual control levers extend vertically from the tops of the bodies of the devices along the axes about which the two outlet orifices of each device are symmetrically disposed. By positioning said orifices in an offset manner relative to the median plane of the body, the control levers are similarly offset relative to said plane and when two devices are assembled together in a mutually reversed configuration, their respective control levers are offset about the median plane: with short levers that are close to one another because of the narrowness of the bodies of the assembled devices, such an offset is most beneficial in facilitating handling.

Advantageously, a hydraulic remote control distributor valve device of the invention includes two link orifices for connection to the source of hydraulic fluid under pressure and disposed on one of the side faces, and two interconnection orifices provided in each of the main faces, the interconnection orifices being connected inside the body to respective ones of the two above-mentioned link orifices and being disposed symmetrically about the above-mentioned median plane for the purpose of providing hydraulic interconnection for the fluid under pressure that is exchanged between the source and the assembled together devices, the interconnection orifices having the same accurate positioning on each of the main faces.

Preferably, the hydraulic remote controlled distributor valve device of the invention includes two link orifices for connection to the source of hydraulic fluid under pressure, both of which link orifices are disposed on the same side face. Combining the last two dispositions mentioned above is particularly advantageous since it leaves complete freedom in selecting which link orifices for connection to the hydraulic fluid source are used and fitted with a link coupling, while the unused orifices are neutralized by means of respective fluid-tight plugs. Depending on external constraints, active orifices may be selected both on the same side of the block, or on two respective opposite sides; they may both be on the same body, or they may be on two respective different bodies. In addition, since the orifices of two adjacent devices are not situated on the same side of the block because said devices are mutually reversed, the same advantage of being able to fit the active orifices with couplings of diameter greater than the thickness of the body is reproduced.

Advantageously, each hydraulic interconnection orifice open out from the bottom of a recess for receiving a sealing ring, the depth of the recess being approximately one-half the depth normally required for receiving such a sealing ring.

Figure 2:
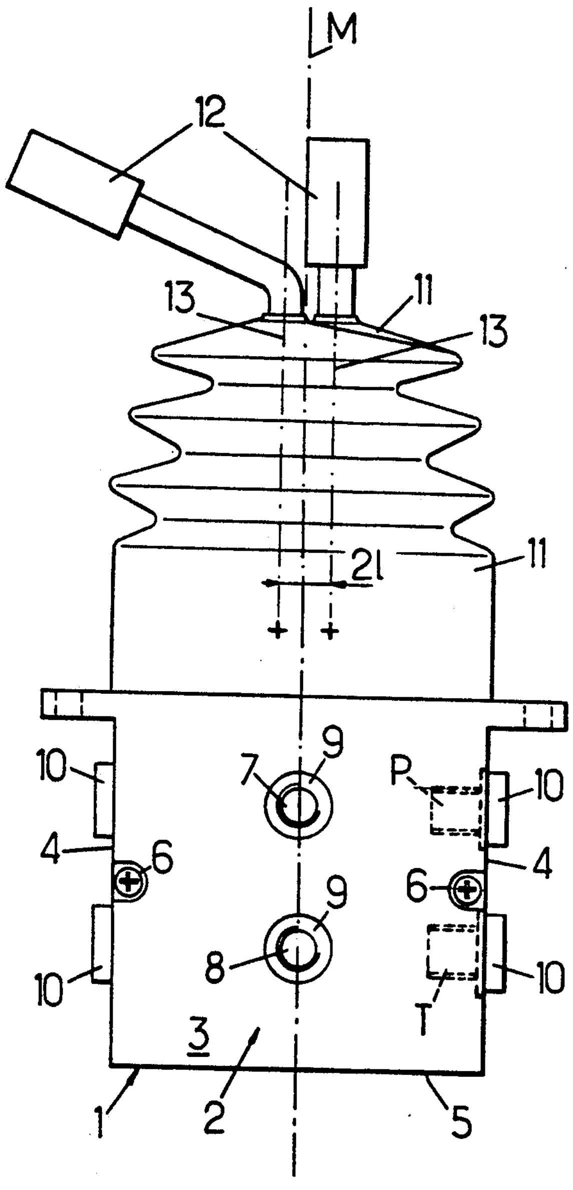
Figure 3:
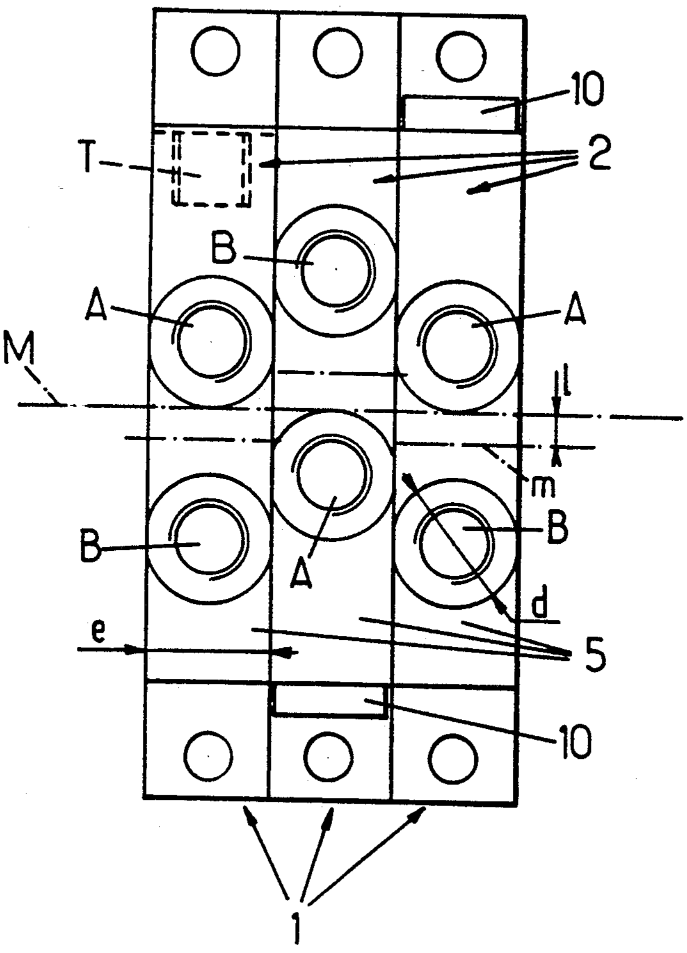

The invention will be better understood on reading the following detailed description of a preferred embodiment given purely by way of illustration. The description makes reference to the accompanying drawings, in Which:

FIGS. 1 and 2 are respectively a side view and a front view of a multiple hydraulic remote control block constituted by assembling together three hydraulic remote control distributor valve devices each individually organized in accordance with the invention; and FIG. 3 is a plan view on a different scale of the block of FIGS. 1 and 2.

A hydraulic remote control block is constituted by a plurality (three in the figures) of individual hydraulic remote control distributor valve devices or "hydraulic switches" 1.

Each switch comprises a body 2, generally made of metal, which is in the general form of a highly flattened parallelepiped having two main faces 3, together with two side faces 4 and a bottom face 5 that are all narrow (corresponding to the narrow width e of the hydraulic switch body).

One of the side faces 4 of each body 2 is provided with two threaded link orifices for connection to a source of hydraulic fluid under pressure, namely an orifice P for connection to a hydraulic pump and an orifice T for connection to a return tank. The face on the opposite side does not have any such openings.

The main faces 3 are provided with assembling means 6 comprising through holes that receive assembly tie bars. These same faces are also provided with two interconnection orifices 7 and 8 which are in communication through the inside of the body with the link orifices P and T, respectively. Each interconnection orifice 7 and 8 opens out from he bottom of a recess 9 that is designed to receive an annular sealing ring (not shown), the depth of said recess being approximately one-half the depth normally required for receiving such a sealing ring.

In the main face 3, the assembly means and the interconnection orifices are disposed in symmetrical manner about a median plane M of the body 2 that extends perpendicularly to the main faces 3 and to the bottom face 5. In the example shown, the assembly means 6 comprise two tie bars situated in two through holes situated adjacent to opposite edges of the main faces 3 and symmetrically about the plane M, whereas the two interconnection orifices 7 and 8 are situated one above the other and are centered on said plane M.

Because of the interconnection orifices, the entire block assembly only requires one P orifice and one T orifice to be active, while the other, unused link orifices are closed by fluid-tight plugs 10.

Finally, the bottom face 5 of each body 1 is provided with two threaded outlet orifices for working fluid given respective references A and B, which orifices are designed to be connected to the hydraulic member that is to be controlled by the device 1. The two orifices A and B are disposed asymmetrically about the median plane M, with the offset 1 between said median plane M and the midplane m between the axes of the two orifices A and B being equal to or greater than $\frac{1}{2}\sqrt{(d^2-e^2)}$, where d is the outside diameter of the link coupling for mounting on each of the orifices (in the drawings the diameter d is the diameter of a countersunk region provided around each orifice to receive the coupling).

Because of the dispositions adopted, two switches can be assembled together equally well the same way round or in a mutually reversed configuration, i.e. because of the symmetry of the main faces, the corresponding main faces of two adjacent switches may be mounted one against the other. In particular, the interconnection links between the P circuits and the T circuits are set up automatically by the facing orifices 7 and 8, with the corresponding sealing rings then being sheltered in the cavities formed by the facing recesses 9.

The alternating configuration shown in the figures is particularly advantageous in that the outlet orifices A and B present on the bottom faces 5 of the assembled-together bodies 2 are no longer in alignment as is the case in prior art switch blocks, but they are offset by a distance 1 alternately to one side and to the other side of the median plane M. The value of the offset 1 is selected as mentioned above, thereby making it possible to fit each orifice A and B with a link coupling of diameter d greater than the thickness e of the body 2, with the coupling freely overlapping beyond the edges of the corresponding body.

Similarly, the side faces 4 of the bodies 2 in a block of switches are alternately provided with orifices P and T, and are not provided with such orifices. The active P and T orifices can thus also be fitted with respective couplings of diameter greater than the thickness of the bodies. In addition, only one P orifice and only one T orifice are required for the entire block, and which ones of the P and T orifices are active can be chosen freely in any manner that is appropriate given the surrounding circumstances (P and T on the same side face of the same body as shown in FIG. 3, or on different bodies, both on the same side of the block, or on opposite sides), while still retaining the advantages of simplified manufacture that are conferred by having both orifices on the same side face of each body.

The unused orifices are closed by plugs 10, which, given the reversed configuration f the bodies, can likewise be greater in diameter than the thickness of each body.

In addition, the body 2 of each switch is surmounted by a fluid-tight bellows 11 from which an operating lever 12 emerges, the lever being straight or bent. Structurally, the axis 13 of each lever lies in the midplane m that is symmetrically disposed between the two corresponding link orifices A and B. As a result, the offset imparted by the invention in the positioning of the orifices A and B relative to the median plane M gives rise to a corresponding offset of the lever axes 13 relative to said median plane M. This means that the axes 13 of the levers of two switches disposed in a mutually reversed configuration are offset by a distance 21. This offset is most advantageous since it facilitates grasping the individual levers which may themselves be small if the switches are small in size, thus requiring them to be handled with the fingertips.

Naturally, and as can be seen from the above, the invention is not limited in any way to the particular applications and embodiments described above; on the contrary, the invention extends to any variants thereof.

I claim:

1. A hydraulic remote control distributor valve device for interposing between a source of hydraulic fluid under pressure and a controlled hydraulic member, the device including switch means suitable for enabling said hydraulic member to be controlled using hydraulic fluid under pressure from said source, the device including a body (1) whose general shape is approximately that of a flat parallelepiped, having:

two main faces (3) on which assembly means (6) are provided enabling at least two hydraulic remote control distributor valve devices to be stacked together main face against main face to build up a multiple hydraulic remote control block; and two side faces (4) and a bottom face (5) that are narrow and on which orifices (P, T; A, B) are disposed respectively for receiving link couplings for hydraulically connecting the device with the source of hydraulic fluid under pressure, and for connecting it to the member to be controlled;

characterized:

in that two working fluid outlet orifices (A, B) for connection to the hydraulic component to be controlled are situated on the bottom face (5);

in that the narrowness of the body is such that the width e of the bottom face (5) is less than the diameter d of the link couplings that may be fitted to said outlet orifices;

in that the two outlet orifices (A, B) are disposed asymmetrically relative to a median plane (M) of the body (1) perpendicular to the main faces (3) and the bottom face (5), being offset relative to said median plane (M) by an offset 1 equal to or greater than $\frac{1}{2}\sqrt{(d^2-e^2)}$; and in that the assembly means (6) situated on the main faces (3) of the body (1) are disposed symmetrically about said median plane (M);

whereby two consecutive distributor valve devices can be assembled together so that corresponding main faces are facing each other, such that couplings of diameter greater than the width of the bottom faces (5) can freely overlap the adjacent device.

2. A hydraulic remote control device according to claim 1, characterized in that it includes two link orifices (P, T) for connection to the source of hydraulic fluid under pressure and disposed on one of the side faces (4), and two interconnection orifices (7, 8) provided in each of the main faces (3), the interconnection orifices being connected inside the body to respective ones of the two above-mentioned link orifices (P, T) and being disposed symmetrically about the above-mentioned median plane (M) for the purpose of providing hydraulic interconnection for the fluid under pressure that is exchanged between the source and the assembled together devices, the interconnection orifices (7, 8) having the same accurate positioning on each of the main faces (3).

3. A hydraulic remote control device according to claim 2, characterized in that each hydraulic interconnection orifice (7, 8) open out from the bottom of a recess (9) for receiving a sealing ring, the depth of the recess being approximately one-half the depth normally required for receiving such a sealing ring.

4. A hydraulic remote control device according to claim 1, characterized in that it includes two link orifices (P,T) for connection to the source of hydraulic fluid under pressure, both of which link orifices are disposed on the same side face (4).

* * * * *